Nov. 16, 1937.  W. G. WOLFE  2,098,988
PROJECTION DEVICE
Filed Dec. 21, 1934  2 Sheets—Sheet 1
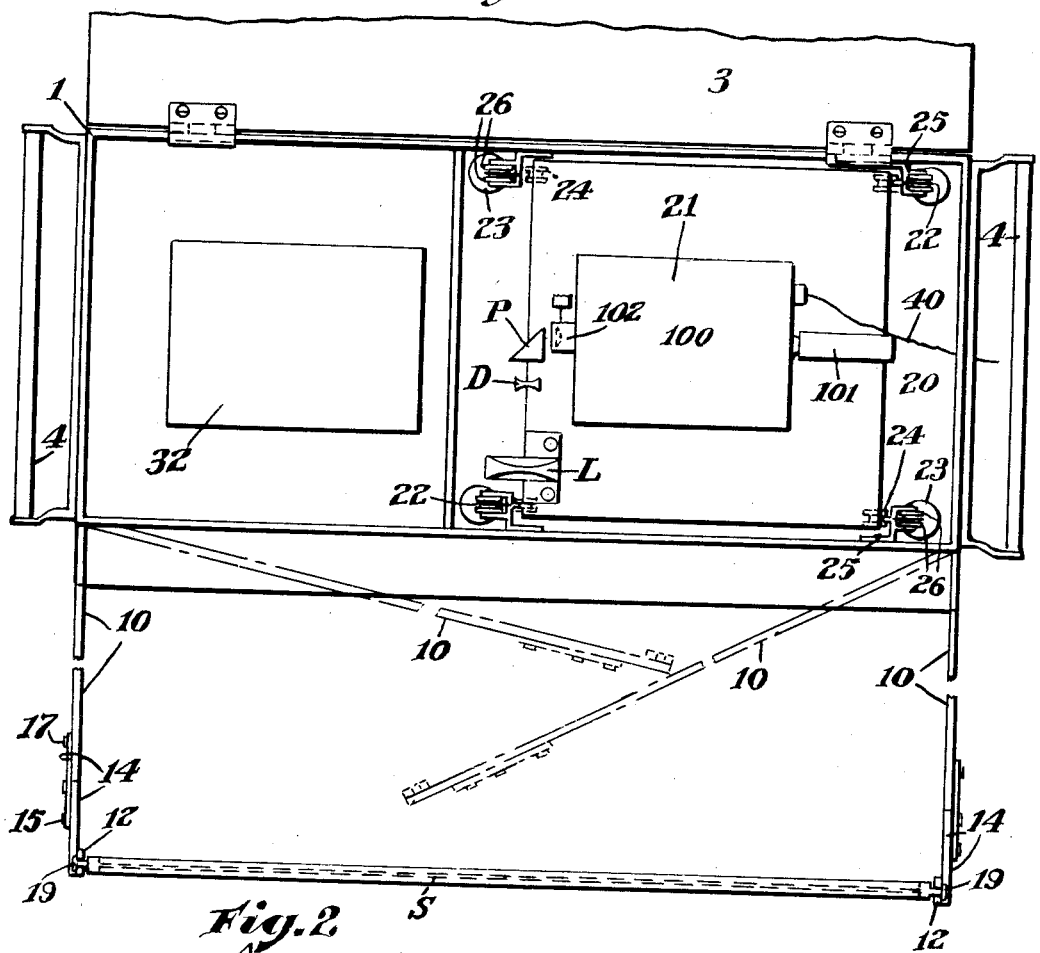
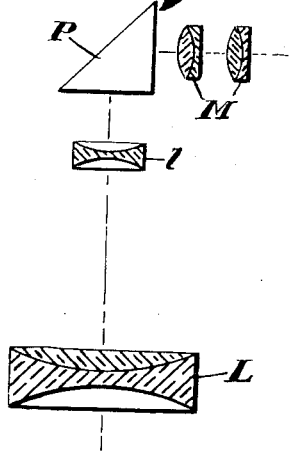
Inventor
Walter G. Wolfe
By Ellis Spear Jr.
Attorney Nov. 16, 1937.  W. G. WOLFE  2,098,988
PROJECTION DEVICE
Filed Dec. 21, 1934   2 Sheets-Sheet 2
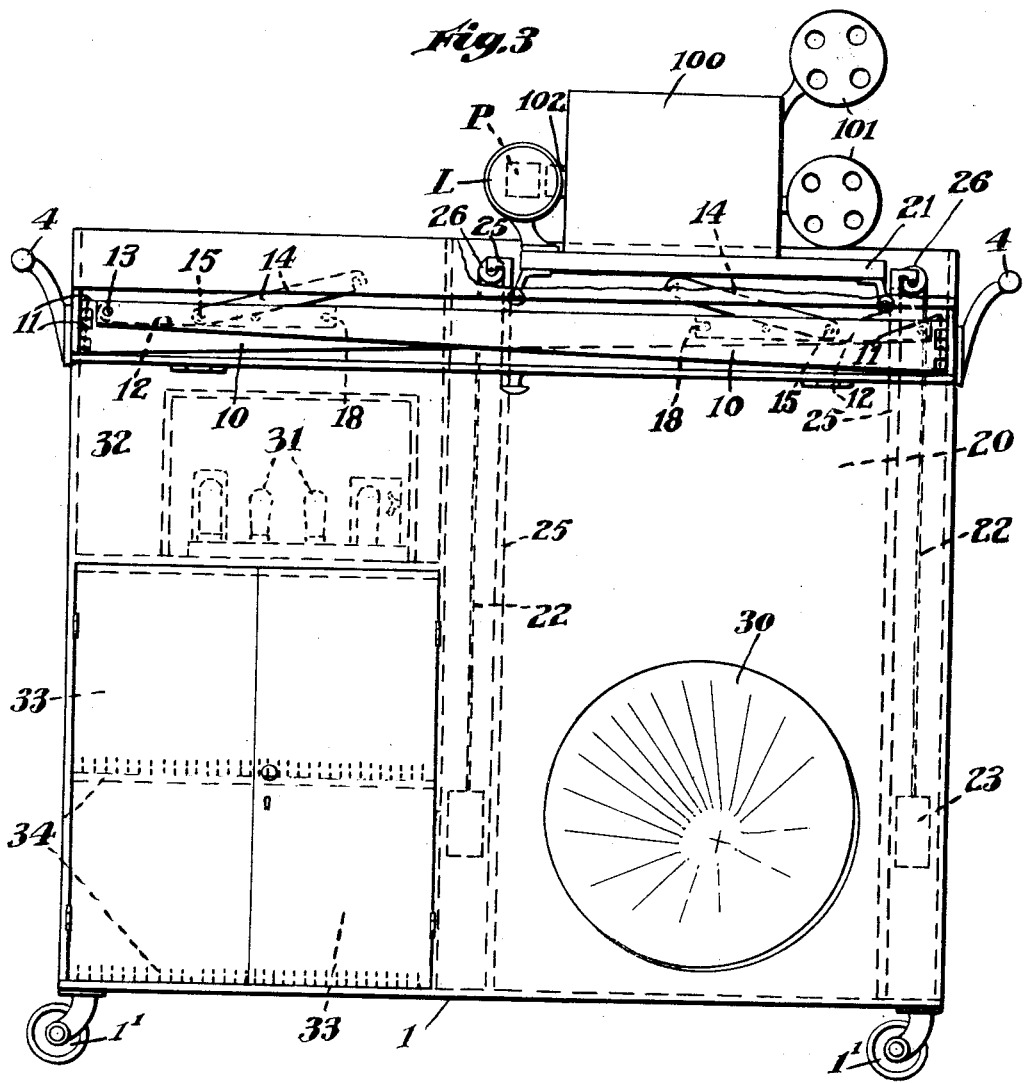
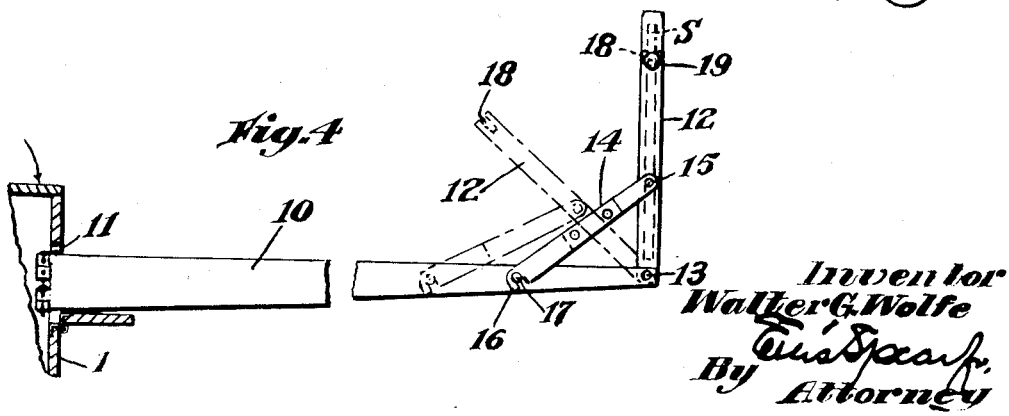
Inventor
Walter G. Wolfe
By Attorney Patented Nov. 16, 1937

2,098,988

UNITED STATES PATENT OFFICE 2,098,988

PROJECTION DEVICE

Walter G. Wolfe, Greenwood, Mass.

Application December 21, 1934, Serial No. 758,637

12 Claims. (Cl. 88—16.2)

In the adaptation of moving picture projection to educational purposes certain difficulties have been encountered and my present invention relates to the overcoming of these difficulties and to the increased efficiency in the use of such visual media as an aid to understanding and memory. The advantages of moving picture presentation with or without auditory supplement have been fully demonstrated. The speaking movie has been found to increase the memory retention of the average student to a very marked degree as it not only makes a direct appeal to those having primarily an auditory memory as well as those having what may be termed mixed visual and auditory memories, but the spoken word goes even further in educational projects. It seems to supply in many instances that necessary interpretation which might be incorrectly made by the pupil if the picture alone were relied upon. I will therefore discuss my invention in connection with the speaking movie in the school room as illustrative of one of its most important fields, although its usefulness is widely varied. This is particularly true of the 16 millimeter or like small film.

The usual manner of projection requires a darkened room and the projector located behind or amongst the pupils with electrical connections running through the seating space to the loud speaker which should be located at the screen. All this involves mechanical noises and lends itself to confusion and distraction of attention. Furthermore, notes cannot be taken in the dark and thus the educational advantage of the students or notations has been lost.

My concept is that of an equipment in the form of a mobile self-contained unit capable of rapid preparation for operating and yet foldable as an enclosed casing, secure against tampering or unauthorized use. The advantages of such an embodiment of my concept will appear from a consideration of the illustrative apparatus shown in the accompanying drawings. From these and the following description of them and their uses, the many advantages and added possibilities will be apparent, particularly to those who have become acquainted with the educational potentialities of the so-called talking movie.

Throughout the specification and drawings like reference characters are employed to indicate corresponding parts, and in the drawings:

Fig. 1 is a plan view of an apparatus in accordance with my invention.

Fig. 2 is a diagrammatic indication of the projection optics of such an apparatus.

Fig. 3 is a front elevation of such apparatus, and

Fig. 4 a detail of the folding screen arm.

One of the great advantages of such an apparatus according to my concept is that it provides for projection on a translucent or transmitting screen at a fixed distance and without the necessity of continued re-focusing. It will be observed by reference to the drawings that the screen S is supported by the arms 10 at a comparatively short distance from the cabinet 1. For example, in practice this may be about 30 inches which brings the dimensions of such apparatus down to very convenient size.

This is made possible by the use of optics along the lines of my prior inventions, for example, such as that used in the wide angle projection set forth in my previous Letters Patent No. 1,802,099, dated April 21, 1931. In that patent the discussion dealt illustratively with so-called backstage projection, that is, projection from behind the screen which was in its usual position and thus between the projector and the audience.

My present invention contemplates further application of this principle by which the translucent screen is in a similar manner presented before the audience and transmits from behind, i. e. from the top of the casing of the apparatus itself. This makes it possible for the teacher or lecturer to have the entire equipment conveniently at hand, as for example, on the teaching rostrum or at the teacher's desk.

In view of the desirability of consolidating all elements of such an apparatus I shall disclose herein a single compact movable housed equipment in which I make the cabinet 1 of greater length than width and provide therein compartments so disposed that when the cabinet is divided vertically the sound reproducing apparatus is enclosed in one half, the loud speaker in the lower portion of the other half, and the picture projection apparatus, when not in use, disposed over the loud speaker, all as illustrated in Fig. 3. However, as it is desirable to produce a picture of reasonable size readily observable from all parts of the usual class or like room I provide the wall of my cabinet of largest dimensions to support the screen carrying arms. This I effect in the form shown by securing the arms 10 and their related screen supporting members illustrated in Fig. 4 to the two upper front corners of the housing 1 as shown in Figs.

1 and 3. In this way I provide a screen of substantially the length of the housing to be used while at the same time the projection apparatus may be housed within a relatively small space within the housing. Such apparatus with the carriage 21 and film reels 11 as appears in Fig. 3 is of considerable over-all size and is most compactly housed if its projecting face is directed to the side rather than the front of the housing 1, which position is transversely of or at right angles to the preferred location of the screen. My concept permits this and still makes it possible to project the miniature picture on the screen even though it is necessary to turn the path of the projected beam. This I effect as illustrated in Fig. 2, by interposing the prisms P between the projection lenses M and wide angle lens L which focuses the picture on the screen S.

For the purposes of the present discussion reference may be had to the optics diagrammatically indicated in Fig. 2. In this I have indicated a usual pair of projector lenses M focused in any usual manner to project a beam on the prism P from which it is reflected at right angles to the wide angle lens L formed as a double negative. The lens or lens system M is optically the same in principle as that discussed in my previous Letters Patent of 1931, but in miniature design to provide for the short distance projection of images from a 16 millimeter film.

I preferably also introduce a small double negative $l$ adjacent the prism P to increase the divergence of the beam and permit a close-up mounting of the larger lens L. I am able in this way to keep within modest dimensions for my case or cabinet so that it will afford adequate stand and yet be convenient as a piece of school room furniture.

I preferably provide the cabinet 1 with swivel wheels or caster mounts $1^1$ so that the device can be moved into position or out of position, as desired, within the room or moved from room to room or floor to floor in the building.

The casing generally indicated at 1 is compartmented so as to provide as indicated at the right of Fig. 3 a well or pit 20 which extends about half way down the casing to a depth sufficient to receive a carriage or elevator 21 on which is supported the projector 100 with its rolls 101 and projecting mount 102 carrying the usual projection lenses M for focusing. The elevator 21 also carries the prism P which is placed in line with the axis of the projection lenses M so as to give a total reflection of the light through the smaller double negative $l$ and larger wide angle negative L. The prism and the two lenses $l$ and L are all centered on the axial line of projection which is also centered at the center of the screen S. The carriage 21 may be supported in any suitable manner but preferably is suspended on a cable 22 balanced by a counterweight 23. It is provided with grooved rollers 24 which run on the flange of four angle irons 25 supported in the four corners of the pit 20. At the top these angle irons or trackways 25 support pulleys 26 through which the cables 22 pass. Beneath the pit 20 is provided room for a loud speaker 30 conveniently located as indicated in Fig. 3. This loud speaker is slightly inclined with an upward and inward slant to its axis so as to be directed towards the center of the screen and thus secure the maximum speaking illusion for the picture. This loud speaker is operated from a suitable amplifier 31 which is housed in a compartment 32 on the upper part of the opposite side of the machine. The space below the compartment 32 is sufficient to provide for storage 33 which is preferably subdivided by a shelf 34 so as to form a rack for the film library assigned to the machine.

The machine is preferably provided with a hinged top 3 which when the elevator is lowered and the projector in the casing 1 is closed over the top of the casing makes a secure closure which can be locked in any desired manner. I have indicated at 4 convenient handles by which the equipment can be guided in moving it from place to place as before described.

The arms 10 are hinged at 11 so that they can be folded back in flush with the casing 1 or extended as a parallel pair at right angles from the casing side. The arms 10 have pivoted at their ends foldable supports 12 pivoted at 13 so that they can be erected to parallel position at the end of the arms. In this position they can be locked direct by latches 14 pivoted at 15 in uprights at one end and provided with a hook 16 which may engage with a stud 17 in the arm 10. At their upper ends the supports 12 are notched as at 18 to receive a headed stud 19 set in the frame of the screen S. The screen may be hung on the side of the casing 1 or otherwise conveniently stored when not in use.

From the foregoing it will be seen that my invention permits everything including projector, screen, amplifier and loud speaker to be located in one assembly or piece of suitable equipment on the teacher's rostrum or other convenient location. In such position the screen is near enough so that the teacher can use a pointer and the projector accessible for any adjustment or regulation necessary. By using such equipment the room may be fully lighted so that pupils may take notes and be subject to supervision and observation by the teacher. The apparatus being removed from the student seating space, the noises incident to operation and other attention diverting incidents are far enough away so that they have no undesirable effect.

The screen, as before explained, is supported at a predetermined fixed focus which is in practice only about 30 inches in contrast to the usual screen distance of 12 feet to fifteen feet. The importance of this will be obvious to all familiar with the old difficulties of coordination between the teacher or lecturer and the operator who was formerly located at a distance. In the present instance the teacher or lecturer can operate and control the machine which is maintained in permanent focus and adjustment. Such a compartmented stand in which the projector is housed contains also the sound device complete and also the electric connections all in one unit. The outside connection may be as through a wire 40 suggested in Fig. 1 and passing out through any convenient eyelet in the casing 1 so that it can be plugged in on any ordinary socket provided for such purposes.

The translucent screen shown is of the rigid or framed type, the body or transmitting surface of which is of translucent cloth adapted for such purposes. If desired, a roller screen may be provided. All these and various other advantages will speak eloquently to those skilled in the art of teaching or entertaining or of projecting pictures for any other purpose. As stated at the outset, the education aspect is put forth as illustrative because it is of such immediate and far reaching importance. Such equipment, however, on account of its mobility is well adapted for advertising or electioneering campaigns or for itinerant entertainment in country villages where no regular moving picture hall could be maintained. Such equipment requires no licensed operator and no booth or inspector as the whole casing and equipment is fireproofed and universally approved by underwriters.

Various modifications in construction and design may be made, and in fact are contemplated to meet special needs, although the cabinet shown is very versatile in its fulfillment of a wide range of requirements.

What I therefore claim and desire to secure by Letters Patent is:—

1. A motion picture projection outfit comprising a mobile compartmented stand having at one end a vertical pit, a projector mount vertically movable in said pit so as to be lowered within the pit or elevated to the surface thereof, counterweighted means for the raising and lowering of the mount, a projector on said mount and axially disposed at right angles to the line of screen projection, a pair of supports collapsibly mounted adjacent the stand sides and projectable forwardly thereof, a translucent screen detachably mounted on said arms at fixed focal projection distance, a wide angle projection lens mounted on the stand in the screen projection axis, and a prism reflector disposed between the projector and wide angled lens for deflecting the projected beam into the screen axis.

2. A sound motion picture projection outfit comprising a mobile compartmented stand having at one end a vertical pit, a projector mount vertically movable in said pit so as to be lowered within the pit or elevated to the surface thereof, counterweighted means for the raising and lowering of the mount, a projector on said mount and axially disposed at right angles to the line of screen projection, a pair of supports collapsibly mounted adjacent the stand sides and projectable forwardly thereof, a translucent screen detachably mounted on said arms at fixed focal projection distance, a wide angle projection lens mounted on the stand in the screen projection axis, a prism reflector disposed between the projector and wide angled lens for deflecting the projected beam into the screen axis, said stand having amplifier and loud speaker compartments whereby audition is retained behind the pictorial screen.

3. A motion picture projection outfit comprising a mobile stand having a vertical pit, a projector mount vertically movable in said pit so as to be lowered within the pit or elevated to the surface of the stand, means to raise and lower the mount, a projector on said mount and axially disposed at right angles to the line of screen projection, a pair of supports collapsibly mounted adjacent the stand sides and projectable parallel to the line of projection, a translucent screen mountable on said arms at focal projection distance, a wide angle projection lens mounted on the stand in the axis of screen projection, and a beam deflector disposed between the projector and wide angled lens for directing the projected beam into the screen axis.

4. A motion picture projection outfit comprising a mobile stand having a vertical pit, a projector mount vertically movable in said pit so as to be lowered within the pit or elevated to the surface of the stand, means to raise and lower the mount, a projector on said mount and axially disposed at right angles to the line of screen projection, a pair of supports collapsibly mounted adjacent the stand sides and projectable parallel to the line of projection, a translucent screen mountable on said arms at focal projection distance, a wide angle projection lens mounted on the stand in the axis of screen projection, a beam deflector disposed between the projector and wide angled lens for directing the projected beam into the screen axis, said stand having amplifier and loud speaker compartments whereby audition is retained behind the pictorial screen.

5. A motion picture projection apparatus consisting of an encased vertical stand, a projector mount vertically movable in said stand so as to be lowered within it or elevated to the top thereof, a projector on said mount and axially disposed at right angles to the line of screen projection, a pair of supports projectable therefrom parallel to the line of projection, a translucent screen mountable on said arms at focal projection distance, a wide angle projection lens mounted in association with the projector in the screen projection axis, and a prism reflector disposed between the projector and wide angled lens for deflecting the projected beam into the screen axis.

6. A motion picture projection apparatus consisting of an encased vertical stand, a projector mount vertically movable in said stand so as to be lowered within it or elevated to the top thereof, a projector on said mount and axially disposed at right angles to the line of screen projection, a pair of supports projectable therefrom parallel to the line of projection, a translucent screen mountable on said arms at focal projection distance, a wide angle projection lens mounted in association with the projector in the screen projection axis, a prism reflector disposed between the projector and wide angled lens for deflecting the projected beam into the screen axis, an amplifier in said stand and a loud speaker compartment carried by the stand and directed toward the screen position whereby audition is retained behind the pictorial screen.

7. A mobile moving picture projection unit comprising an elongated casing, screen arms projectable adjacent the casing ends to support a translucent screen at a fixed distance from the cabinet side, a projector mount movably supported in the cabinet and positionable at the cabinet or within its walls, a projection set on said mount including a projector disposed laterally of the screen axis and at a right angle thereto, a beam deflector on said mount and common to both the projector and screen axis, wide angle optics on said mount and disposed between the deflector and the screen in the axis of the projected beam whereby to cover the screen at the short fixed distance of the arm's length.

8. A mobile moving picture projection unit comprising an elongated casing, screen arms of length less than that of the casing projectable adjacent the casing ends to support a translucent screen at a fixed distance from the cabinet side, a projector mount movably supported in the cabinet and positionable at the cabinet or within its walls, a projection set on said mount including a projector disposed laterally of the screen axis and at a right angle thereto, a beam deflector on said mount and common to both the projector and screen axis, wide angle optics on said mount and disposed between the deflector and the screen in the axis of the projected beam whereby to cover the screen at the short fixed distance of the arm's length.

9. A mobile moving picture projection unit comprising an elongated casing having plural compartments, screen arms of length less than that of the casing pivoted adjacent the casing ends and projectable to support a translucent screen at a fixed distance from the cabinet side, a projector mount movably supported in the cabinet and positionable at the cabinet or within one of its compartments, a projection set on said mount including a projector disposed laterally of the screen axis and at a right angle thereto, a beam deflector on said mount and common to both the projector and screen axis, wide angle optics on said mount and disposed between the deflector and the screen in the axis of the projected beam whereby to cover the screen at the short fixed distance of the arm's length.

10. A mobile moving picture projection unit comprising an elongated casing having plural compartments, screen arms of length less than that of the casing pivoted adjacent the casing ends and projectable to support a translucent screen at a fixed distance from the cabinet side, a projector mount movably supported in the cabinet and positionable at the cabinet or within one of its compartments, a projection set on said mount including a projector disposed laterally of the screen axis and at a right angle thereto, a beam deflector on said mount and common to both the projector and screen axis, wide angle optics on said mount and disposed between the deflector and the screen in the axis of the projected beam whereby to cover the screen at the short fixed distance of the arm's length, a loud speaker located in another of said compartments and directed towards the screen center and a sound amplifier disposed in another of said compartments and operative connections between the several members of the set.

11. A sound motion picture projection outfit comprising a rectangular cabinet sub-divided to define two compartments, sound reproduction apparatus in one of said compartments and picture projection apparatus adapted to be raised from and lowered into the other compartment and having its projecting face disposed transversely of said cabinet, a translucent screen extending along the entire length of said housing at a fixed focal projection distance therefrom, means beneath said projector in said second compartment directing the sound toward the screen, means for reflecting the projected beam toward said screen, and wide angle optics between said projector and screen to increase the beam spread to cover the screen at the short fixed distance of the screen from the projector.

12. A sound motion picture projection outfit comprising an oblong rectangular cabinet, a rectangular screen, a picture projection apparatus disposed at one end of the casing and laterally of the center thereof and having its projection axis parallel to said longest side, foldable screen supporting members mounted adjacent the ends of said cabinet and disposable for screen support in parallel relation to the longest side of the cabinet, and at short fixed distances from the projection apparatus, sound production apparatus at the other end of the cabinet, a loud speaker disposed beneath the picture projection apparatus and directed toward the screen position when mounted on said supports, wide angle optics mounted adjacent the longest side of the cabinet and having its axis transversely thereof and intersecting the projection axis, means at said intersection for reflecting the projected beam to the wide angle optics, said wide angle optics being disposed between the projector and screen when positioned by its unfolded supporting members to increase the beam-spread to cover the screen at the short fixed distance of the screen from the projector.

WALTER G. WOLFE.